United States Patent [19]
Genuit et al.

[11] 3,846,695
[45] Nov. 5, 1974

[54] SERIES-PARALLEL DUAL SWITCHING REGULATOR FOR USE WITH A VARIETY OF LINE VOLTAGES

[75] Inventors: Luther L. Genuit, Scottsdale; John R. Nowell, Phoenix, both of Ariz.

[73] Assignee: Honeywell Information Systems Inc., Waltham, Mass.

[22] Filed: May 7, 1973

[21] Appl. No.: 357,996

[52] U.S. Cl.................... 321/27 R, 307/71, 321/4
[51] Int. Cl. ........................................... H02m 7/04
[58] Field of Search..... 307/37, 71; 321/27 R, 45 R, 321/4

[56] References Cited
UNITED STATES PATENTS

| | | | |
|---|---|---|---|
| 3,012,206 | 12/1961 | Burnside | 321/45 R X |
| 3,047,789 | 7/1962 | Lowry | 321/45 R X |
| 3,510,745 | 5/1970 | Futterer | 307/71 X |
| 3,573,597 | 4/1971 | Genuit | 321/45 R |
| 3,705,341 | 12/1972 | Frank | 321/45 C X |

Primary Examiner—William H. Beha, Jr.
Attorney, Agent, or Firm—Lloyd B. Guernsey; Edward W. Hughes

[57] ABSTRACT

The power section of the switching regulator is divided into two identical parts. The two parts may be connected in series when a high value of power line voltage is used. The two parts are connected in parallel when a lower value of power line voltage is used. The same value of regulated output voltage may be obtained with either the series or the parallel connection.

3 Claims, 4 Drawing Figures

SERIES-PARALLEL DUAL SWITCHING REGULATOR FOR USE WITH A VARIETY OF LINE VOLTAGES

CROSS-REFERENCE TO RELATED APPLICATIONS

A detailed description of the operation of the error amplifier may be found in the U.S. Pat. No. 3,707,684 by John R. Nowell, entitled "Error Amplifier for Use With a Switching Regulator." A more detailed description of the operation of the switching regulator can be found in the U.S. Pat. No. 3,573,597, by Luther L. Genuit and John R. Nowell, issued Apr. 6, 1971, entitled "High Current Switching Regulator with Overlapping Current Output Pulses."

BACKGROUND OF THE INVENTION

This invention relates to a series-parallel dual switching regulator and more particularly to a regulator which is divided into two identical parts. These two parts are connected in series when a high value of power line voltage is used and are connected in parallel when a lower value of power line voltage is used. The regulator provides the same value of regulated output voltage when either the series or the parallel connection is used.

In high speed data processing systems switching regulators may be used to provide D.C. power to electronic circuits in the system. These regulators are smaller and more efficient than prior art power supplies so that the regulators may be located in the cabinets which contain the circuits rather than in a separate cabinet as required when prior art power supplies are used. Location of regulators near the circuits greatly reduces the length of cables which distribute the current to the circuits and reduces the amount of error signals which may be caused by variations in voltage in long cables.

The switching regulator may employ a pair of transformers, a pair of silicon controlled rectifiers and a source of signals to convert an unregulated DC. voltage, such as 150 volts, to an accurately regulated voltage such as five volts. The silicon controlled rectifiers are employed as switches between the source of unregulated DC. voltage and the transformers. The silicon controlled rectifiers are located on the "high" voltage side of the transformer where the current and power losses in these rectifiers are low, thereby causing the switching regulator to have a high degree of efficiency. The regulated DC. voltage obtained from the secondary windings on the transformers is supplied to a pair of voltage output terminals. The transformers provide isolation between the regulated DC. voltage and the source of unregulated DC. voltage so that a short circuit in the silicon controlled rectifier will not cause damage to the microcircuit modules which provide the load on the switching regulator.

The silicon controlled rectifier is a semiconductor device having an anode, a cathode and a gate. The silicon controlled rectifier can be used as an ON-OFF switch which can be turned on in a very few microseconds. Normally the silicon controlled rectifier cannot conduct current between anode and cathode thereof until a pulse of current larger than a threshold value flows from gate to cathode. If a positive voltage difference exists between the anode and cathode when a pulse of current flows into the gate, the silicon controlled rectifier "fires," i.e., is rendered conductive and a current will flow from the anode to the cathode. The rate at which the current flow from anode to cathode increases when the silicon controlled rectifier fires must be limited to prevent damage to the rectifier. Once anode-cathode flow commences, the gate has no further control over such current flow. Current flow from anode to cathode in a rectifier can be terminated only by reducing the anode to cathode current below a "holding" or minimum current value. A more detailed description of the operation of a silicon controlled rectifier can be found in the "Silicon Controlled Rectifier Manual," 4th Edition, 1967, published by the General Electric Co., Syracuse, New York.

A signal source is coupled to the voltage output terminal of the switching regulator and develops trigger signals whose frequency is determined by the value of voltage between the voltage output signals. The trigger signals are coupled to the silicon controlled rectifiers in the switching regulator and cause these rectifiers to deliver energy through the transformers to output filter capacitors which are connected to the voltage output terminals. The signal source senses any change in the value of any regulated output voltage and causes a change of frequency in the trigger signals delivered to the switching regulator.

The signal source includes an error amplifier, a rate generator and a trigger generator. The error amplifier develops a current having a value which is determined by the voltage at the output terminals of the switching regulator. This current is applied to the rate generator which develops pulses having a frequency which is determined by the value of current from the error amplifier. The pulses from the rate generator are applied to the trigger generator which develops trigger signals which are applied to the gates of the silicon controlled rectifiers in the switching regulator.

Data processing systems which are built by any given manufacturer may be used in different countries having widely different values of power line voltages. Some prior art power supplies use special tapped transformers to convert the power line voltages to a standard voltage which is applied to the power supply in order to obtain a standard regulator output voltage from the power supply. In other power supplies a motor-generator set is used to convert the power line voltage to a standard input voltage for the power supply. The tapped transformers and the motor-generator sets are bulky and expensive. What is needed is a circuit which can provide a standard regulated output voltage for a wide range of input voltages without using these bulky and expensive prior art supplies. The circuit of the present invention alleviates the disadvantages of the prior art by providing a dual switching regulator which delivers the same value of regulated output voltage for a wide range of line input voltages.

It is, therefore, an object of this invention to provide an improved switching regulator which can be used with a wide variety of power line voltages.

Another object of this invention is to provide a power supply which can be used with a wide variety of power line voltages without having a variable power transformer to change the voltage to the input terminals of the power supply.

A further object of this invention is to provide a switching regulator which delivers a predetermined value of output voltage for a wide variety of power line voltages.

Still another object of this invention is to provide a switching regulator which delivers a predetermined value of output voltage for a wide variety of power line voltages without using a variable power transformer.

Another object of this invention is to provide an inexpensive switching regulator which can be used with a wide variety of power line voltages.

SUMMARY OF THE INVENTION

The foregoing object are achieved in the present invention by using a dual switching regulator which is divided into two identical parts. These parts are connected in series when a high value of power line voltage is used and are connected in parallel when a lower value of power line voltage is used. The dual regulator can provide the same value of regulated output voltage when either the series or the parallel connection is used.

Other objects and advantages of this invention will become apparent from the following description when taken in connection with the accompanying drawings.

DESCRIPTION OF THE POWER SUPPLY SYSTEM

Figure 1:
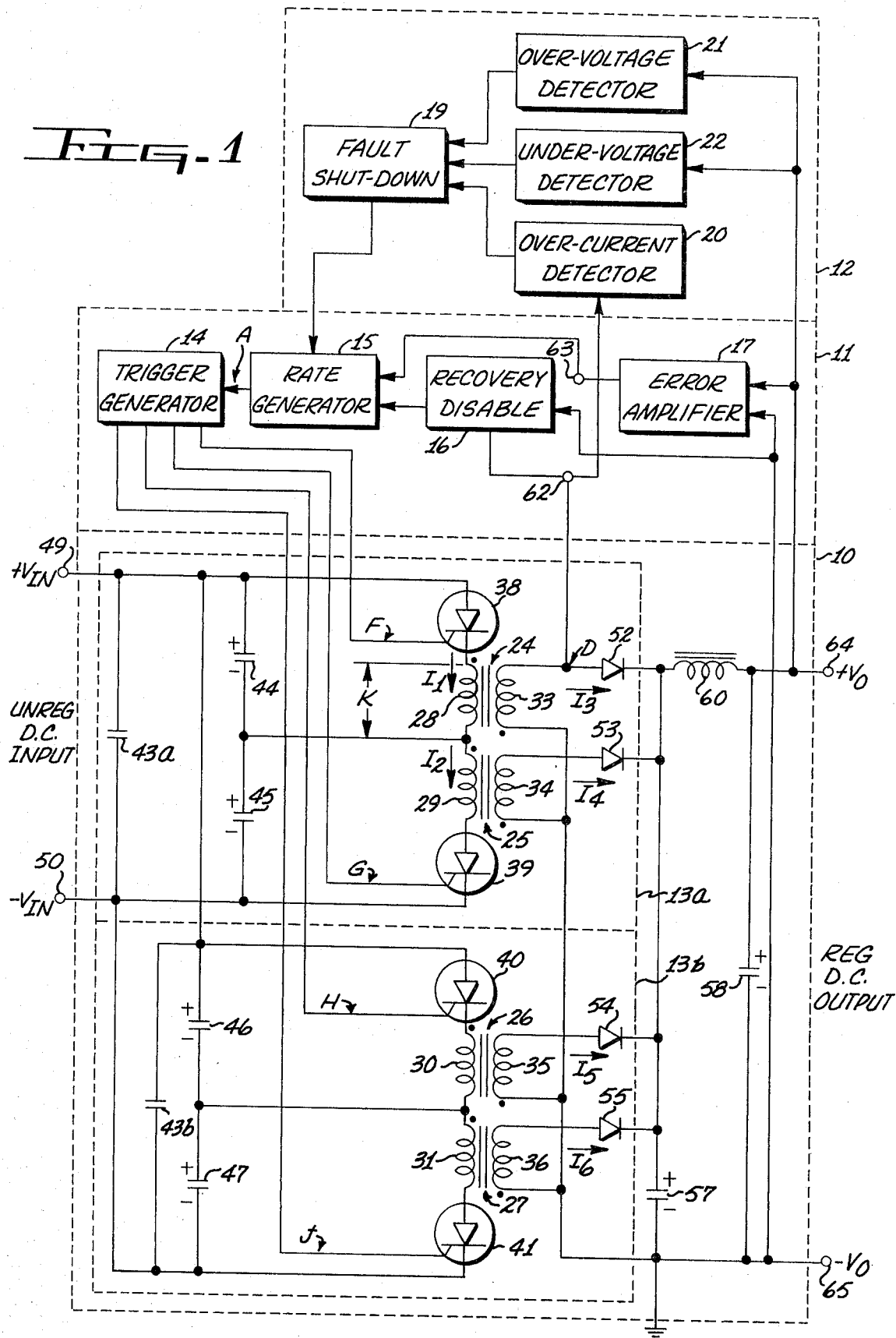
FIG. 1 is a schematic diagram of a dual switching regulator and its associated control circuits.

Referring more particularly to the drawings by the characters of reference, FIG. 1 discloses a power supply system which is designed to provide a constant supply of DC. output voltage for a wide range of values of output current and for monitoring the current delivered to a load which may be connected to the system. As indicated in FIG. 1, the system comprises a dual switching regulator 10, a switching regulator control circuit 11 for providing trigger signals to switching regulator 10, and a circuit 12 for monitoring the current and voltage delivered by the power supply. The switching regulator control circuit 11 comprises a counter and trigger generator 14, a rate generator 15, a recovery disable circuit 16 and an error amplifier 27. The error amplifier 27 detects any change in the voltage at the output terminals of the switching regulator and provides a current whose value is determined by the change in the output voltage. The current from the error amplifier 17 causes the rate generator 15 to develop pulses having a frequency which is determined by the value of the current from the amplifier 17. Pulses from the rate generator cause the trigger generator 14 to develop trigger signals for the switching regulator. The recovery disable circuit 16 senses the time that output current is being delivered by one of the portions of the switching regulator to the output filter capacitors and prevents the rate generator from delivering pulses during the time that this current is being delivered.

The overcurrent detector 20, the over-voltage detector 21 and the under-voltage detector 22 sense any abnormal value of current or voltage at the output terminals of the switching regulator and provide signals to the fault shutdown circuit 19. When the fault shutdown circuit 19 receives a signal from any of the detectors 20, 21 and 22 it provides a signal to the rate generator which disables the rate generator and prevents any pulses from being supplied to trigger the switching regulator.

Switching Regulator

As indicated in FIG. 1, the dual switching regulator 10 includes a pair of switching regulators 13a and 13b, each of the pair of regulators having a pair of transformers. The regulator 13a includes a pair of transformers 24 and 25, each having a primary winding and a secondary winding. The primary windings 28 and 29 are connected in series and are coupled to the high voltage unregulated DC. power supply which is connected to the input terminals 49 and 50. A pair of silicon controlled rectifiers 38 and 39 control the current supplied by the unregulated DC. power supply to the primary windings of transformers 24 and 25. The anode of silicon controlled rectifier 38 is connected to the positive terminal 49 of the unregulated DC. power supply and the cathode of silicon controlled rectifier 38 is connected to the upper end of primary winding 28. The gate of silicon controlled rectifier 38 is connected to one lead of the trigger generator 14 which provides trigger signals to render rectifier 38 conductive. The anode of silicon controlled rectifier 39 is connected to the lower end of primary winding 29 and the cathode of silicon controlled rectifier 39 is connected to the negative terminal 50 of the unregulated DC. power supply. A second lead from the trigger generator 14 is connected to the gate of silicon controlled rectifier 39 to provide trigger signals to render rectifier 39 conductive. The other half of the dual regulator includes transformers 26 and 27 and silicon controlled rectifiers 40 and 41.

Figure 2:
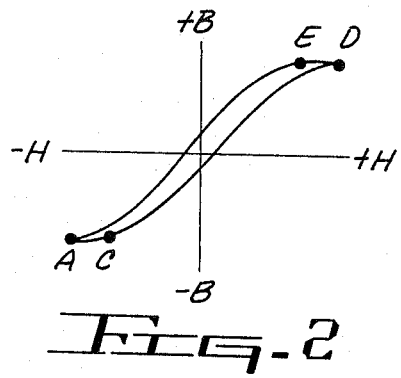
FIG. 2 illustrates a magnetization curve which is useful in explaining the operation of the circuit shown in FIG. 1.

The magnetic core employed in transformers 24–27 provides the magnetization characteristics illustrated in the magnetization curve of FIG. 2. The magnetizing force H is equal to the product of the number of turns in a winding on the transformer core and the number of amperes of current for each turn of wire divided by the length of the core. Since the physical length of a particular transformer core is constant the magnetizing force of the transformer is often expressed as the number of amperes times the number of turns, or "ampere-turns." The flux density B is a number of lines of flux per square centimeter of the transformer core and is determined by the value of magnetizing force and the type of material used in the core. A discussion of the magnetization curves can be found in the textbook "Magnetic Circuits and Transformers" by E.E. Staff, M.I.T., 1943, published by John Wiley and Sons, New York, N.Y.

Figure 3:
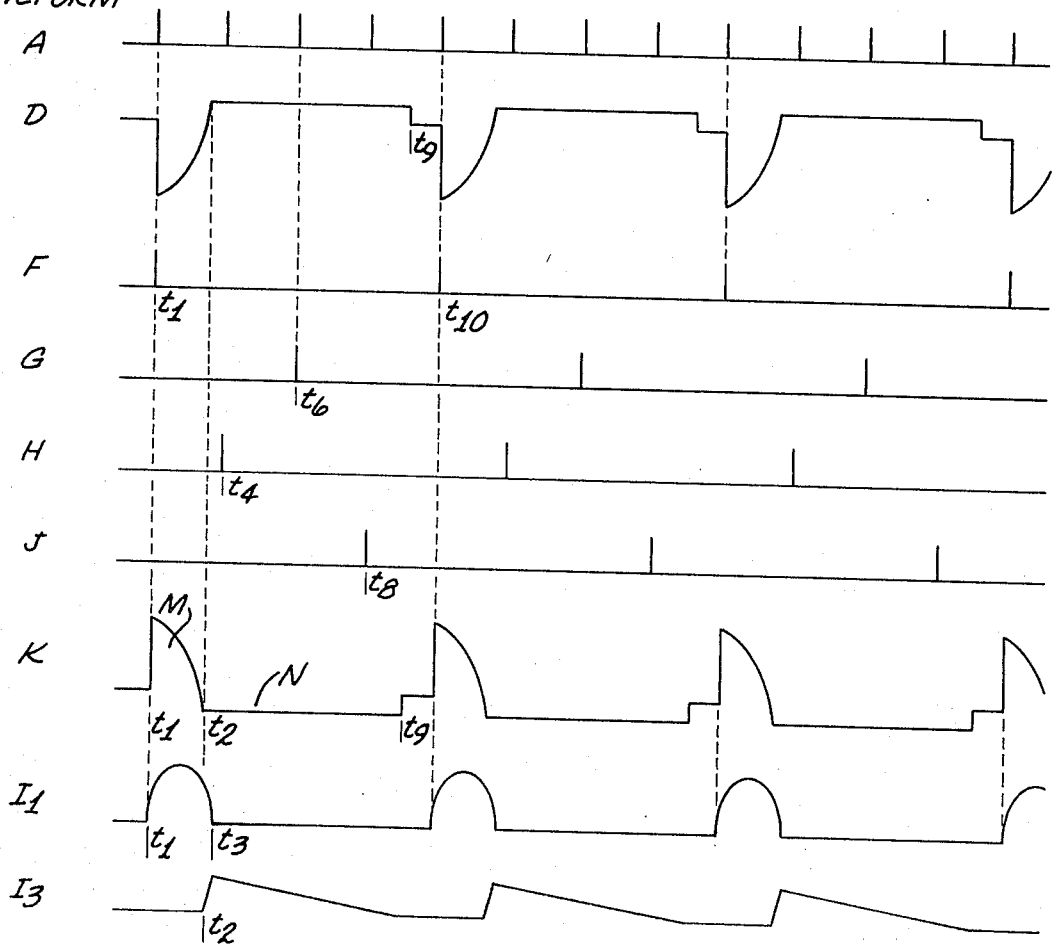
FIG. 3 illustrates waveforms which are useful in explaining the operation of the switching regulator.

The operation of one half of the dual switching regulator of FIG. 1 will now be discussed in connection with the magnetization curve shown in FIG. 2 and the waveforms shown in FIG. 3. It should be understood that the other half of the dual switching regulator operates in a similar manner. It should also be understood that additional sections of the switching regulator may be connected to the circuit shown in FIG. 1.

A pair of capacitors 44 and 45 provide predetermined quantities of electrical energy to the transformers 24 and 25 each time one of the silicon controlled rectifiers 38 and 39 is rendered conductive. Each time one of the silicon controlled rectifiers 38 and 39 is rendered nonconductive the same predetermined quantity of energy is delivered by one of the transformers 24 and 25 through diodes 52 and 53 to a filter capacitor 57. Prior to the time t1 shown in FIG. 3, capacitor 44 of FIG. 1 is charged to the polarity shown in FIG. 1. At time t1 a pulse from trigger generator 14 renders silicon controlled rectifier 38 conductive so that the voltage across capacitor 44 is supplied to the primary winding 28 of transformer 24 causing a current I1 to flow from the upper plate of capacitor 44 through anode to cathode of rectifier 38, through the primary winding 28 to the lower plate of capacitor 44.

The current I1 through primary winding 28 causes a change of flux in the transformer core and causes the operating point to move from point A toward point C of the magnetization curve in FIG. 2. This change in flux produces a voltage across primary winding 28, which limits the rate of increase in current through silicon rectifier 38, thus preventing possible damage to rectifier 38. A positive voltage applied to the upper end of primary winding 28 causes the operating point to move from point C to point D. The distance between point C and point D is proportional to the product of the voltage applied to primary winding 28 and the duration of time this voltage is applied.

The voltage applied to primary winding 28 is magnetically coupled through the transformer core to the secondary winding 33. Between time t1 and time t2 secondary winding 33 has a positive polarity of voltage at the lower end of the winding and a negative polarity of voltage at the upper end of the winding. At this time, the voltage across the secondary winding 33 causes diode 52 to be back biased so that no current flows through the diode or through the secondary winding 33. Capacitor 44 provides current I1 until this capacitor has discharged at time t2 as shown in the waveform I1 of FIG. 3. The area M under the curve of waveform K (FIG. 3) between time t1 and time t2 is the sum of the products of the voltage applied to primary winding 28 and the duration of time the voltage is applied and this area M represents the total energy stored in the core of transformer 24. When the voltage applied to primary winding 28 has a zero value at time t2 the operating point reaches point D.

At time t2, the energy stored in the core of transformer 24 reverses the polarity of voltage across each of the transformer windings so that a negative polarity of voltage is developed at the upper end of primary winding 28. This negative polarity of voltage at the upper end of primary winding 28 causes the operating point in FIG. 2 to move from point D toward point E and to begin moving toward point A. Again the distance between point E and point A is proportional to the products of the voltage across primary winding 28 and the duration of time this voltage is applied. The area N under the curve of waveform K between times t2 and t9 is the sum of the products of the voltage across primary 28 and the time this voltage is applied. This area N represents a total energy which the core of transformer point 24 returns through the transformer. The voltage across primary winding 28 causes current I1 to charge capacitor 44 to a polarity opposite to the polarity shown in FIG. 1.

The energy in the core of transformer 24 causes the voltage across secondary winding 33 to increase to a value larger than the voltage across filter capacitor 57 so that a current I3 flows through diode 52 to charge capacitor 57. The energy which is stored in the core of transformer 24 when silicon controlled rectifier 38 conducts is proportional to the difference between the flux at point A and point D on the magnetization curve of FIG. 3; and the energy which is transferred to the secondary winding 33 when silicon controlled rectifier 38 is rendered nonconductive, is proportional to the difference between the flux at point D and point A. Since the distance between point A through point C to point D shown in FIG. 2 is substantially the same as the distance between point D through point E to point A substantially all the energy which was stored in the core of the transformer between times t1 and t2 is returned and stored on capacitors 57 and 58. Capacitor 44 delivers substantially the same amount of energy to the transformer each time the silicon controlled rectifier 38 is rendered conductive so that the amount of energy delivered to capacitors 57 and the voltage across these capacitors is determined by the frequency of signals applied to the gate of rectifier 38. Capacitor 45 also provides a predetermined quantity of energy to transformer 25 each time silicon controlled rectifier 39 is rendered conductive. Capacitors 46 and 47 provide predetermined quantities of energy to transformers 26 and 27 each time that the silicon controlled rectifiers 40 and 41 respectively are rendered conductive.

Prior to time t6, capacitor 45 is charged to the polarity shown in FIG. 1. At time t6 a pulse from the trigger generator 14 renders silicon controlled rectifier 39 conductive so that current I2 flows from the upper plate of capacitor 45 through the primary winding 29, from anode to cathode of rectifier 39 to the lower plate of capacitor 45. Current I2 through the primary winding and the voltage impressed across this winding cause the operating point of the characteristic curve in FIG. 2 to move from point A through point C to point D and cause a predetermined quantity of energy to be stored in the core of transformer 25. When silicon controlled rectifier 39 is rendered nonconductive, this energy is transferred through the secondary winding 34 causing a current I4 to charge capacitor 57 as described above.

The amount of voltage across capacitors 57 and 58 can be controlled by controlling the frequency of the trigger signals which trigger generator 14 applies to the gates of the silicon controlled rectifiers 38–41. The frequency of the trigger signals is determined by the value of the current applied to the rate generator 15. When an increase in the amount of current drawn by a load (not shown) connected across the output terminals 64 and 65 in FIG. 1 causes the value of the output voltage to fall below a predetermined reference level, the frequency of the signals from trigger generator 14 increases. This increase in the frequency of the output signals causes an increase in the rate of energy delivered to capacitors 57 and 58 and increases the voltage between output terminal 64 and 65 to the predetermined reference level. The voltage at the output terminal 64 of the power supply controls the frequency of the signals from trigger generator 14 so that the voltage at the output terminals 64 and 65 is substantially constant even when the current drawn from this power supply varies over a wide range of values.

Figure 4:
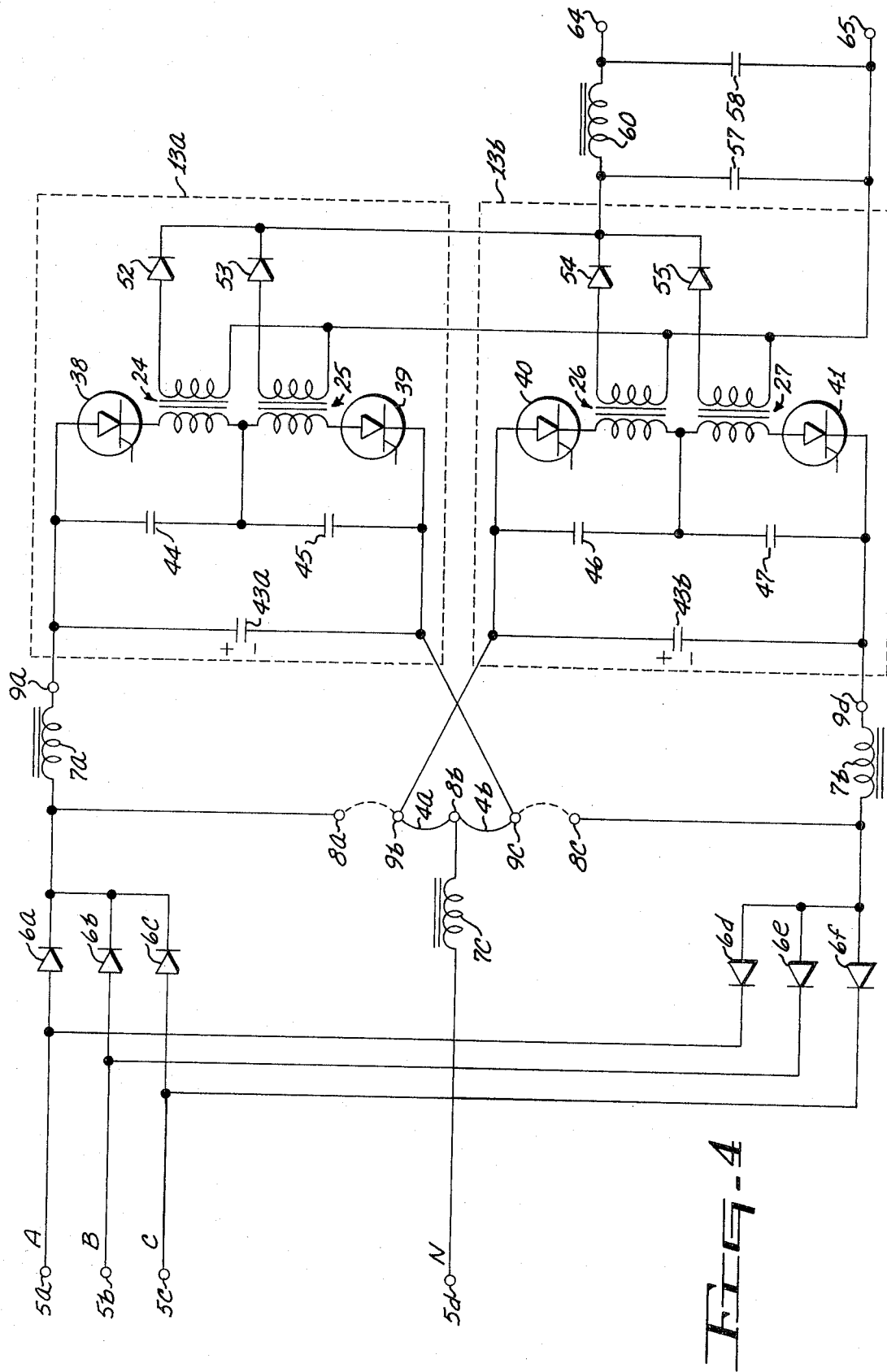
FIG. 4 is a schematic diagram of an embodiment of the present invention.

The switching regulators 13a and 13b of FIG. 1 are shown connected in parallel, with the anodes of silicon controlled rectifiers 38 and 40 each connected to the + input terminal 49 and the cathodes of silicon controlled rectifiers 39 and 41 each connected to the − input terminal 50. In most of the larger data processing systems the dual switching regulator is connected to a 3-phase A.C. power source. The connection to such a 3-phase source may be more clearly seen by referring to FIG. 4. The regulator control circuits shown in FIG. 1 have been omitted in FIG. 4. The input terminals 5a-5d of FIG. 4 are connected to phases A, B, C and to the N or neutral phase of the 3-phase source. Diodes 6a-6f, chokes 7a-7c and capacitors 43a and 43b provide the unregulated DC. input for the dual switching regulator.

When a first jumper wire is connected between terminals 8a and 9b and a second jumper wire is connected between terminals 8c and 9c as shown by the dash lines, the switching regulators 13a and 13b (FIG. 4) are connected in parallel. The entire unregulated DC. voltage is applied to each of the regulators 13a and 13b. This circuit operates as described above.

When the first jumper wire 4a is connected between terminals 8b and 9b, as shown by the solid line, and the second jumper wire 4b is connected between terminals 8b and 9c regulators 13a and 13b are connected in series. When regulators 13a and 13b are connected in series the unregulated DC. voltage between input terminals 9a and 9d is divided by capacitors 43a and 43b. Approximately one-half of the unregulated voltage is developed across each of these capacitors 43a and 43b. Thus, the voltage applied to each of the regulators 13a and 13b is approximately one-half the total unregulated voltage.

When the 208 or the 220 volt 3-phase A.C. power lines are connected to terminals 5a-5d of FIG. 4 the regulators may be connected in parallel. When the 380 volt 3-phase lines are connected to terminals 5a-5d the regulators may be connected in series. When the regulators are connected in series for 380 volt applications the voltage applied to each of the regulators is slightly less than when the regulators are connected in parallel for 208 volt or 220 volt operation. When the regulators are connected in series the error amplifier, rate generator and trigger generator of FIG. 1 cause the dual switching regulator to operate at a higher frequency to compensate for the slightly lower line voltage so that a series-connected dual regulator with 380 volts at the input terminals develops the same output voltage as a parallel-connected dual regulator with 220 volts at the input terminals.

While the principles of the invention have now been made clear in an illustrative embodiment, there will be many obvious modifications of the structure, proportions, materials and components without departing from those principles. The appended claims are intended to cover any such modifications.

We claim:

1. A series-parallel dual switching regulator for use with a polyphase power line having first, second, third and fourth output terminals, said regulator comprising:

first and second switching regulators each having first and second input terminals;

first, second, third, fourth, fifth and sixth diodes each having an anode and a cathode, said anodes of said first, second and third diodes each being connected to a corresponding one of said first, second and third line output terminals, said cathodes of first, second and third diodes being coupled to said first input terminal of said first regulator, said cathodes of said fourth, fifth and sixth diodes each being connected to a corresponding one of said first, second and third line output terminals, said anodes of said fourth, fifth and sixth diodes being coupled to said second input terminal of said second regulator;

first, second and third connector terminals, said first connector terminal being connected to said cathodes of said first, second and third diodes, said second connector terminal being coupled to said fourth line output terminal, said third connector terminal being connected to said anodes of said fourth, fifth and sixth diodes;

means for selectively connecting said second input terminal of first regulator to one of said second and said third connector terminals; and means for selectively connecting said first input terminal of said second regulator to one of said first and said second connector terminals.

2. A series-parallel dual switching regulator as defined in claim 1 including:

first and second inductors, said first inductor being connected between said first input terminal of said first regulator and said cathodes of said first, second and third diodes, said second inductor being connected between said second input terminal of said second regulator and said anodes of said fourth, fifth and sixth diodes.

3. A series-parallel dual switching regulator for use with a polyphase power line having first, second, third and fourth output terminals, said regulator comprising:

first and second switching regulators each having first and second input terminals;

first, second, third, fourth, fifth and sixth diodes each having an anode and a cathode, said anodes of said first, second and third diodes each being connected to a corresponding one of said first, second and third line output terminals, said cathodes of said fourth, fifth and sixth diodes each being connected to a corresponding one of said first, second and third line output terminals;

first, second and third connector terminals, said first connector terminal being connected to said cathodes of said first, second and third diodes, said third connector terminal being connected to said anodes of said fourth, fifth and sixth diodes;

first, second and third inductors, said first inductor being connected between said first input terminal of said first regulator and said first connector terminal, said second inductor being connected between said second input terminal of said second regulator and said third connector terminal, said third inductor being connected between said fourth line output terminal and said second connector terminal;

means for selectively connecting said second input terminal of first regulator to one of said second connector terminal and said third connector terminal; and means for selectively connecting said first input terminal of said second regulator to one of said first connector terminal and said second connector terminal.

* * * * *